(12) United States Patent
Takagi et al.

(10) Patent No.: US 9,165,222 B2
(45) Date of Patent: Oct. 20, 2015

(54) FORMING SYSTEM, APPARATUS AND STORAGE MEDIUM EXECUTING A JOB BASED ON A PREVIEW LOG IMAGE AND A LOG IMAGE IS GENERATED AS A HISTORY IMAGE

(71) Applicant: KYOCERA Document Solutions Inc., Osaka-shi, Osaka (JP)

(72) Inventors: Jumpei Takagi, Osaka (JP); Keiji Okamura, Osaka (JP); Masaki Kikuchi, Osaka (JP); Ryota Arinobu, Osaka (JP); Toru Yasui, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/470,767

(22) Filed: Aug. 27, 2014

(65) Prior Publication Data
US 2015/0062617 A1    Mar. 5, 2015

(30) Foreign Application Priority Data

Aug. 30, 2013  (JP) ................................. 2013-180550

(51) Int. Cl.
G06K 15/02    (2006.01)
G06K 15/00    (2006.01)

(52) U.S. Cl.
CPC .......... *G06K 15/026* (2013.01); *G06K 15/4095* (2013.01)

(58) Field of Classification Search
None
See application file for complete search history.

(56) References Cited

U.S. PATENT DOCUMENTS

2010/0253964 A1* 10/2010 Isshiki .................... 358/1.14
2010/0321727 A1* 12/2010 Kanai .................... 358/1.15
2011/0161794 A1*  6/2011 Shiohara ................. 715/209
2013/0166579 A1*  6/2013 Saito et al. .............. 707/758

FOREIGN PATENT DOCUMENTS

JP          2007068100 A      3/2007

* cited by examiner

*Primary Examiner* — Martin Mushambo
*Assistant Examiner* — Haris Sabah
(74) *Attorney, Agent, or Firm* — Alleman Hall McCoy Russell & Tuttle LLP

(57) ABSTRACT

An image forming system includes a job executing portion, a preview executing portion, and a log image obtaining portion. The job executing portion executes a job based on an image. The preview executing portion executes displaying a preview of the image before the job is executed. The log image obtaining portion obtains a log image as a history of the image and store the log image in a storage portion. The log image obtaining portion obtains a log image of the preview.

7 Claims, 10 Drawing Sheets

F I G. 4
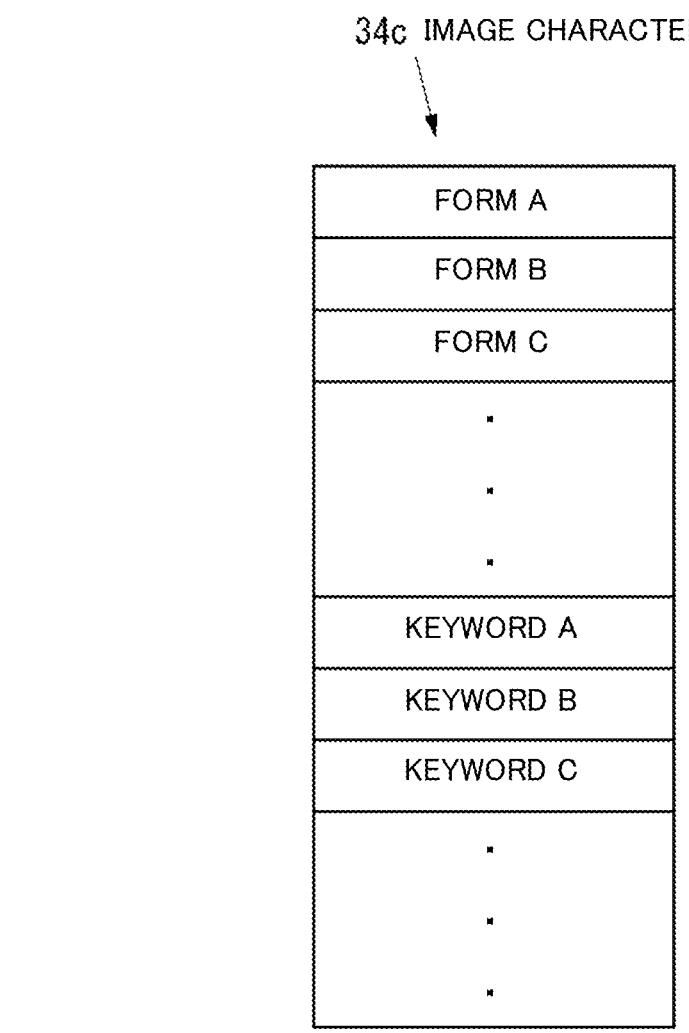

F I G. 1 0
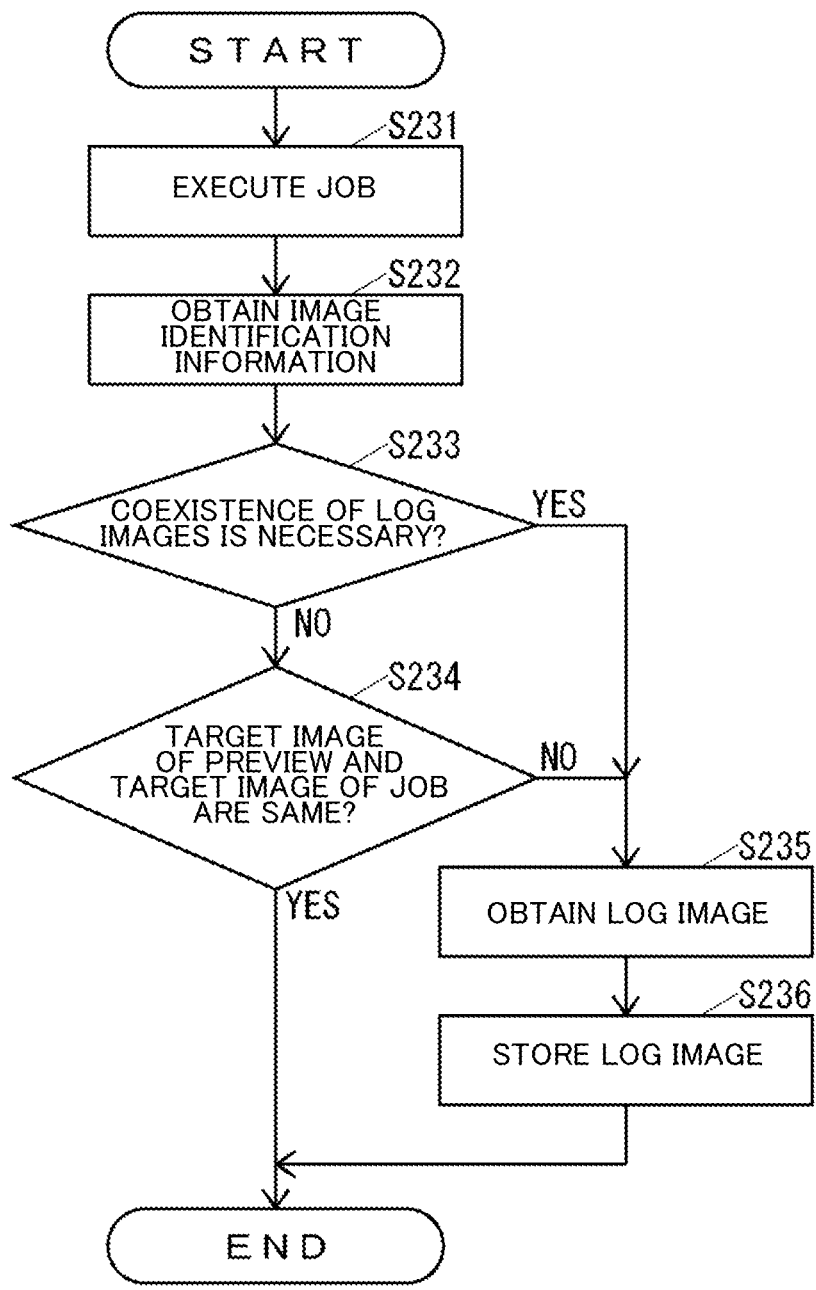

FORMING SYSTEM, APPARATUS AND STORAGE MEDIUM EXECUTING A JOB BASED ON A PREVIEW LOG IMAGE AND A LOG IMAGE IS GENERATED AS A HISTORY IMAGE

INCORPORATION BY REFERENCE

This application is based upon and claims the benefit of priority from the corresponding Japanese Patent Application No. 2013-180550 filed on Aug. 30, 2013, the entire contents of which are incorporated herein by reference.

BACKGROUND

The present disclosure relates to an image forming system and an image forming apparatus that, when executing a job based on an image, obtain a log image as a history of the image, and to a storage medium storing an image forming program.

Information leakages involving image forming apparatuses have been found occurring in organizations such as enterprises. Information leakage occurs, for example, when someone in an organization copies a document of confidential information by using an image forming apparatus to generate a duplicate and brings the duplicate out of the organization.

There is known a typical image forming apparatus that is configured to prevent such an information leakage involving an image forming apparatus. In the typical image forming apparatus, when a job is executed based on an image, a log image is generated and stored as a history of the image.

According to this typical image forming apparatus, the administrator can learn which user executed a job based on which image based on the log images. Thus, the typical image forming apparatus enables the administrator to prevent a violation, such as an information leakage, in advance. In addition, the typical image forming apparatus enables the administrator to identify violators. This gives a pressure to users to inhibit themselves from making a violation.

SUMMARY

An image forming system according to an aspect of the present disclosure includes a job executing portion, a preview executing portion, and a log image obtaining portion. The job executing portion executes a job based on an image. The preview executing portion executes displaying a preview of the image before the job is executed. The log image obtaining portion obtains a log image as a history of the image and store the log image in a storage portion. The log image obtaining portion obtains a log image of the preview.

An image forming apparatus according to another aspect of the present disclosure includes a job executing portion, a preview executing portion, and a log image obtaining portion. The job executing portion executes a job based on an image. The preview executing portion executes displaying a preview of the image before the job is executed. The log image obtaining portion obtains a log image as a history of the image and store the log image in a storage portion. The log image obtaining portion obtains a log image of the preview.

A storage medium according to a further aspect of the present disclosure is a computer-readable non-transitory storage medium. The storage medium stores an image forming program that causes a computer to execute a first step through a fourth step. The first step executes a job based on an image. The second step executes displaying a preview of the image before the job is executed. The third step obtains a log image as a history of the image and stores the log image in a storage portion. The fourth step obtains a log image of the preview.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows an example of the image characteristic information shown in FIG. 3.

FIG. 10 is a flowchart for explaining the operation of the MFP shown in FIG. 2 for executing a job based on the target image.

DETAILED DESCRIPTION

The following describes an embodiment of the present disclosure with reference to the drawings.

First, the structure of an image forming system 10 of the present embodiment is described.

Figure 1:
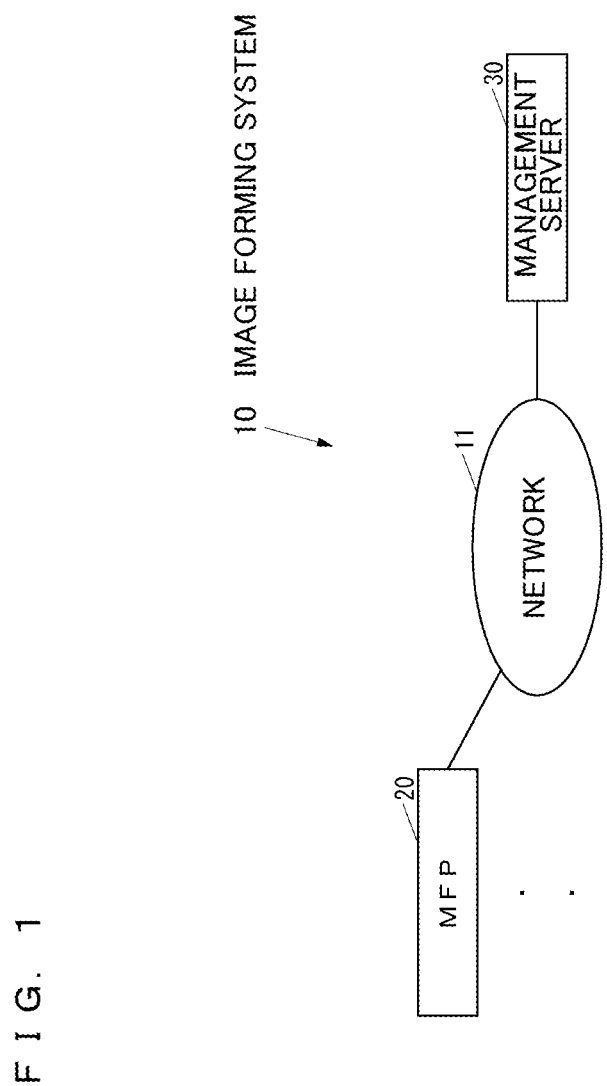
FIG. 1 shows the structure of the image forming system in an embodiment of the present disclosure.

FIG. 1 shows the structure of the image forming system 10 of the present embodiment.

As shown in FIG. 1, the image forming system 10 includes a plurality of MFPs (MultiFunction Peripherals) and a management server 30, wherein the plurality of MFPs include an MFP 20 as an image forming apparatus, and the management server 30 is a computer for managing the plurality of MFPs including the MFP 20. The plurality of MFPs including the MFP 20 and the management server 30 are communicably connected to each other via a network 11 such as a LAN (Local Area Network), the Internet or the like.

The plurality of MFPs included in the image forming system 10 have the same structure as the MFP 20. Accordingly, the following describes only the MFP 20 as a representative of the plurality of MFPs included in the image forming system 10.

Figure 2:
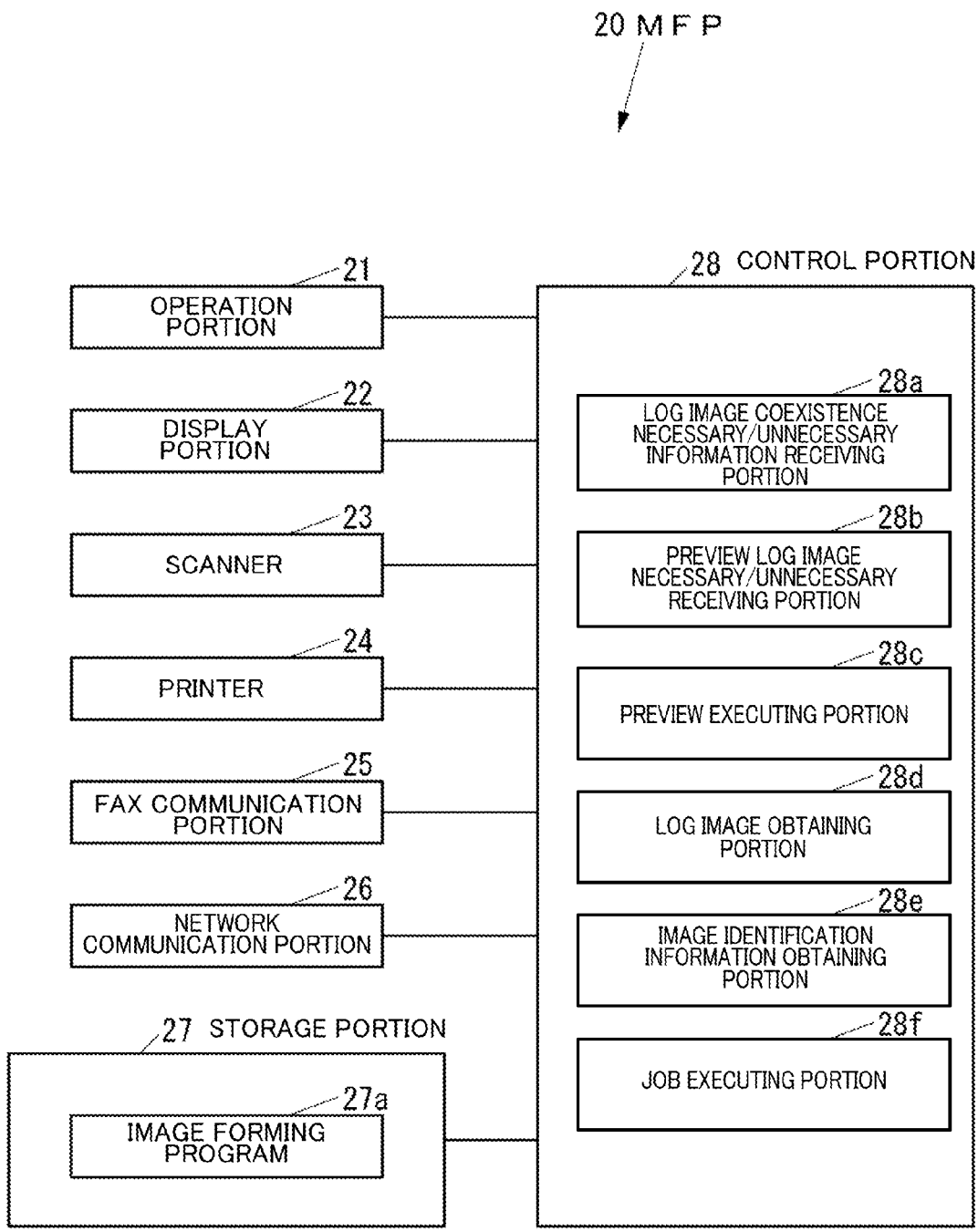
FIG. 2 shows the structure of the MFP shown in FIG. 1.

FIG. 2 shows the structure of the MFP 20.

As shown in FIG. 2, the MFP 20 includes an operation portion 21, a display portion 22, a scanner 23, a printer 24, a FAX communication portion 25, a network communication portion 26, a storage portion 27, and a control portion 28. The operation portion 21 is an input device including buttons through which various user operations are input. The display portion 22 is a display device such as an LCD (Liquid Crystal Display) for displaying various types of information. The scanner 23 is a reading device for reading an image from a document sheet. The printer 24 is a printing device for performing printing on a recording medium such as a paper sheet. The FAX communication portion 25 is a facsimile device for performing a facsimile communication with a not-shown external facsimile device via a communication line such as a public telephone line. The network communication portion 26 is a network communication device for performing a communication with an external device via the network 11 (see FIG. 1). The storage portion 27 is a nonvolatile storage device such as an EEPROM (Electrically Erasable Programmable Read Only Memory) or an HDD (Hard Disk Drive), and stores various types of data. The control portion 28 controls the MFP 20 as a whole.

The operation portion 21 may include an input device that constitutes a touch panel together with the display portion 22.

The storage portion 27 stores an image forming program 27a executed by the MFP 20. The image forming program 27a may be installed in the MFP 20 during the manufacturing stage of the MFP 20. Alternatively, the image forming program 27a may be additionally installed in the MFP 20 from a storage medium such as an SD card, a USB (Universal Serial Bus) memory or the like. Furthermore, the image forming program 27a may be additionally installed in the MFP 20 from the network 11.

The control portion 28 includes, for example, a CPU (Central Processing Unit), a ROM (Read Only Memory), and a RAM (Random Access Memory). The ROM stores programs and various types of data. The RAM is used as a work area of the CPU. The CPU executes programs stored in the ROM or the storage portion 27.

The control portion 28 executes the image forming program 27a stored in the storage portion 27. This enables the control portion 28 to function as a log image coexistence necessary/unnecessary receiving portion 28a, a preview log image necessary/unnecessary receiving portion 28b, a preview executing portion 28c, a log image obtaining portion 28d, an image identification information obtaining portion 28e, and a job executing portion 28f. The log image coexistence necessary/unnecessary receiving portion 28a receives an instruction on whether or not coexistence of log images is necessary, wherein the log image is used as an image data generatng history (hereinafter, referred to as "image history") in the MFP 20. Here, original image data formed in the MFP 20, or compressed or low-resolution image data generated by compressing the original image data or making the resolution of the original image data lower may be used as the log image. In addition, the coexistence of log images means a state where the same log image as a log image, which was obtained in the past and has already been stored, is stored in the storage portion 34, or a state where a plurality of the same log images are stored in the storage portion 34. The preview log image necessary/unnecessary receiving portion 28b receives an instruction on whether or not a log image of a preview of an image that is performed before the job is executed, is necessary (hereinafter, the log image of the preview is referred to as "preview log image"). The preview executing portion 28c executes a preview of an image before the job is executed. The log image obtaining portion 28d obtains a log image. The image identification information obtaining portion 28e obtains image identification information that indicates how much of a specific characteristic an image has. The job executing portion 28f executes a job based on the image.

Figure 3:
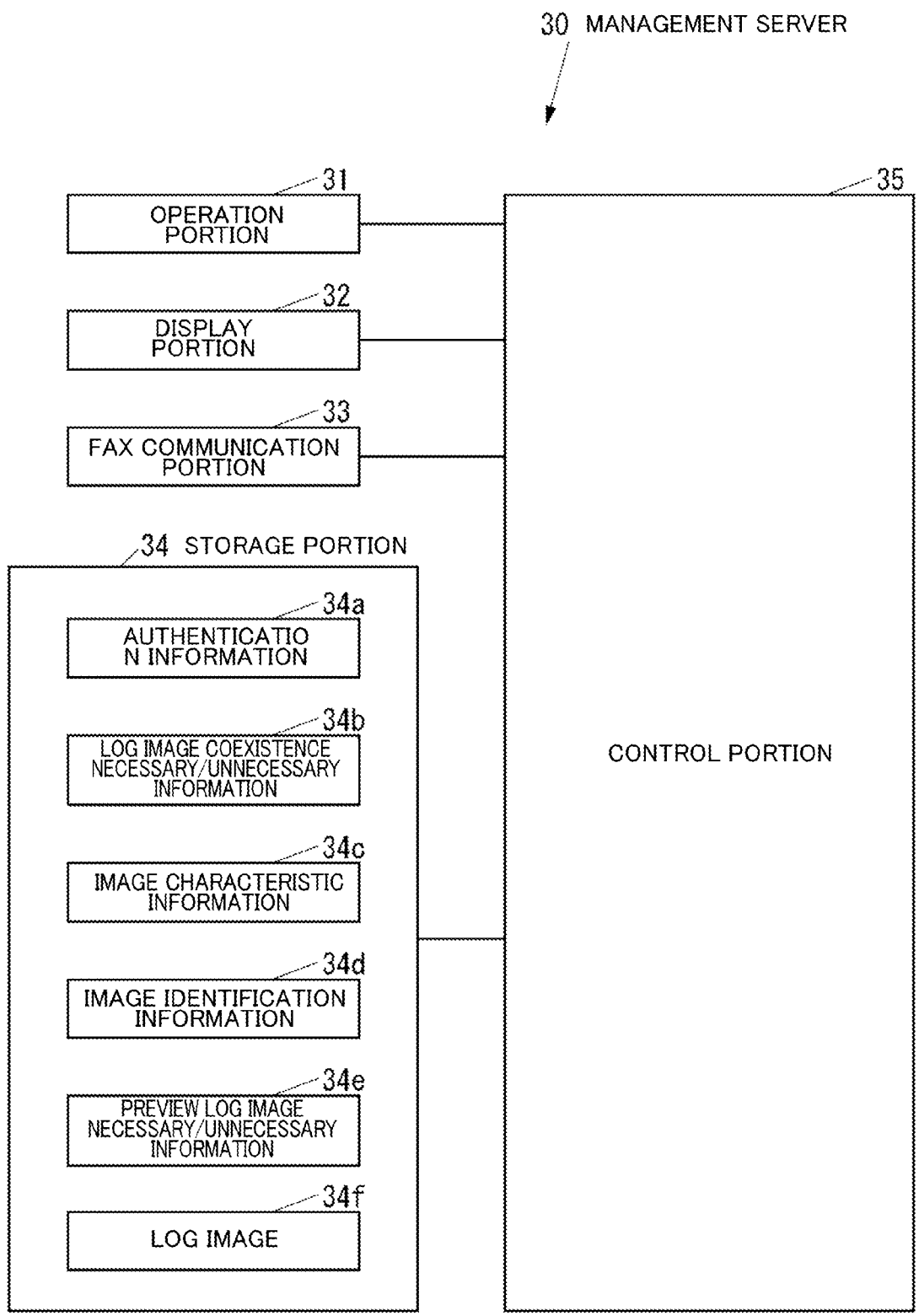
FIG. 3 shows the structure of the management server shown in FIG. 1.

FIG. 3 is a block diagram of the management server 30.

As shown in FIG. 3, the management server 30 includes an operation portion 31, a display portion 32, a network communication portion 33, a storage portion 34, and a control portion 35. The operation portion 31 is an input device including a mouse and a keyboard for inputting various operations. The display portion 32 is a display device such as an LCD for displaying various types of information. The network communication portion 33 is a network communication device for performing a communication with an external device via the network 11 (see FIG. 1). The storage portion 34 is a nonvolatile storage device, such as an HDD (Hard Disk Drive), storing programs and various types of data. The control portion 35 controls the management server 30 as a whole. The management server 30 is, for example, a computer such as a PC (Personal Computer).

The storage portion 34 is capable of storing authentication information 34a, log image coexistence necessary/unnecessary information 34b, image characteristic information 34c, image identification information 34d, preview log image necessary/unnecessary information 34e, and a log image 34f as an image history. The authentication information 34a is a user ID, a password and the like. The log image coexistence necessary/unnecessary information 34b indicates whether or not coexistence of log images is necessary. The image characteristic information 34c indicates items of characteristics of image. The image identification information 34d indicates how much of a specific characteristic an image has. The preview log image necessary/unnecessary information 34e indicates whether or not a preview log image is necessary. It is noted that the authentication information 34a, log image coexistence necessary/unnecessary information 34b, image characteristic information 34c, image identification information 34d, preview log image necessary/unnecessary information 34e, and log image 34f are stored for each user ID. In addition, a plurality of pieces of image identification information 34d can be stored for each user ID, and a plurality of log images 34f can be stored for each user ID.

The control portion 35 includes, for example, a CPU, a ROM, and a RAM. The ROM stores programs and various types of data. The RAM is used as a work area of the CPU. The CPU executes programs stored in the ROM or storage portion 34.

FIG. 4 is a diagram showing an example of the image characteristic information 34c.

As shown in FIG. 4, the image characteristic information 34c can include forms and keywords. It is noted that although in FIG. 4, the forms are identified by their classification names such as "Form A", "Form B", and "Form C", the forms are actually data composed of ruled lines, characters and the like. In addition, in FIG. 4, the keywords are identified by their classification names such as "Keyword A", "Keyword B", and "Keyword C", the keywords are actually data composed of specific characters such as "For Internal Use Only" or the like.

Figure 5:
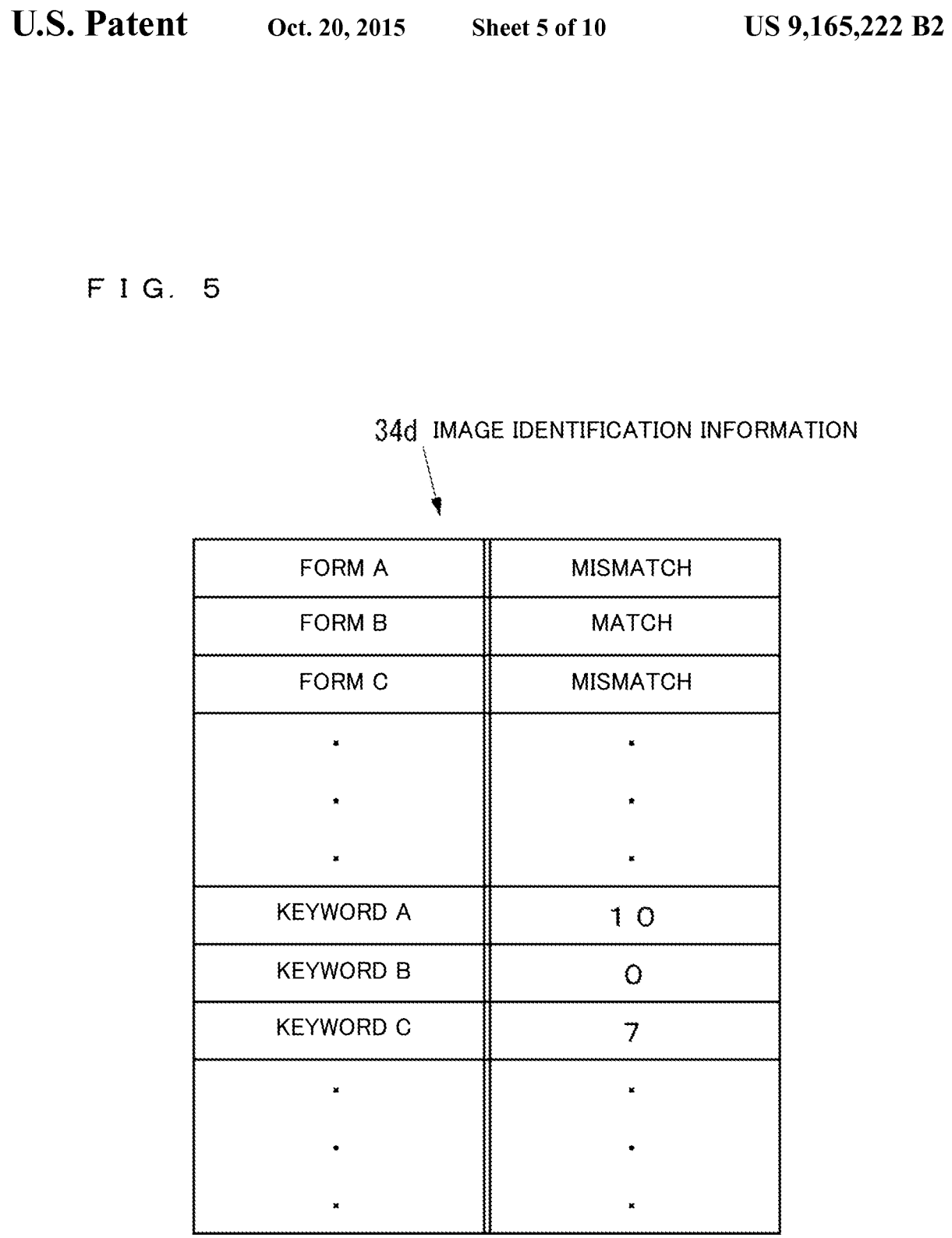
FIG. 5 shows an example of the image identification information shown in FIG. 3.

FIG. 5 shows an example of the image identification information 34d.

As shown in FIG. 5, the image identification information 34d includes: results of determining whether each of the forms included in the image characteristic information 34c is a match or a mismatch by comparing them against each form in an image; and the number of appearances, in the image, of each of the keywords included in the image characteristic information 34c.

Meanwhile, there is known a technology for displaying a preview of the image on the display portion 22 of the MFP 20 (image forming apparatus) before executing a job based on the image. There is a possibility that the image in the preview displayed on the display portion 22 of the MFP 20 may be peeped and the information thereof may be leaked by a person other than the user of the MFP 20. In particular, when the screen size of the display portion 22 is large, this possibility increases. In addition, there is a possibility that a person other than the user of the MFP 20 peeps the image of the preview displayed on the display portion 22 and leaks the information to a third party. The image forming system 10 of the present disclosure is configured to suppress the above-mentioned information leakage that may occur due to the execution of the preview.

Next, the operation of the image forming system 10 is described.

First, the operation of the MFP 20 when the user logs in is described.

After the authentication information is input from the operation portion 21, the control portion 28 of the MFP 20 transmits the authentication information to the management server 30 via the network communication portion 26.

Upon receiving the authentication information transmitted from the MFP 20 via the network communication portion 33, the control portion 35 of the management server 30 determines whether or not the same authentication information 34a as the received authentication information is stored in the storage portion 34. Upon determining that the same authentication information 34a as the received authentication information is stored in the storage portion 34, the control portion 35 transmits login permission information to the MFP 20 via the network communication portion 33. The login permission information indicates that the user is permitted to log in. On the other hand, upon determining that the same authentication information 34a as the received authentication information is not stored in the storage portion 34, the control portion 35 transmits login non-permission information to the MFP 20 via the network communication portion 33. The login non-permission information indicates that the user is not permitted to log in.

Upon receiving the login permission information transmitted from the management server 30 via the network communication portion 26, the control portion 28 of the MFP 20 permits the user to log in. On the other hand, upon receiving the login non-permission information transmitted from the management server 30 via the network communication portion 26, the control portion 28 does not permit the user to log in.

It is noted that the operation of the MFP 20 described as follows is performed during the login of the user.

Next, the operation of the MFP 20 for setting log image coexistence necessary/unnecessary information is described.

The user of the MFP 20 can, via the operation portion 21, instruct the MFP 20 to set the log image coexistence necessary/unnecessary information.

Figure 6:
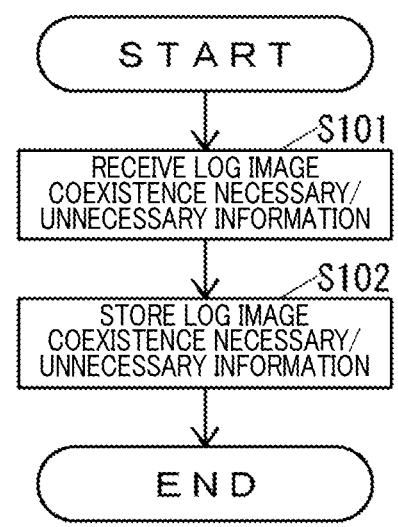
FIG. 6 is a flowchart for explaining the operation of the MFP shown in FIG. 2 for setting the log image coexistence necessary/unnecessary information.

Upon receiving an instruction to set the log image coexistence necessary/unnecessary information, the control portion 28 of the MFP 20 performs the operation shown in FIG. 6.

FIG. 6 is a flowchart of the operation of the MFP 20 for setting the log image coexistence necessary/unnecessary information.

As shown in FIG. 6, the log image coexistence necessary/unnecessary receiving portion 28a of the control portion 28 receives the log image coexistence necessary/unnecessary information via the operation portion 21 (S101).

Subsequently, the log image coexistence necessary/unnecessary receiving portion 28a causes, via the network communication portion 26, the management server 30 to store the log image coexistence necessary/unnecessary information, which was received in S101, as the log image coexistence necessary/unnecessary information 34b that is associated with the user ID of the user who is logging in (S102), and ends the operation shown in FIG. 6.

Next, the operation of the MFP 20 for setting image characteristic information 34c is described.

The user of the MFP 20 can, via the operation portion 21, instruct the MFP 20 to set the image characteristic information.

Figure 7:
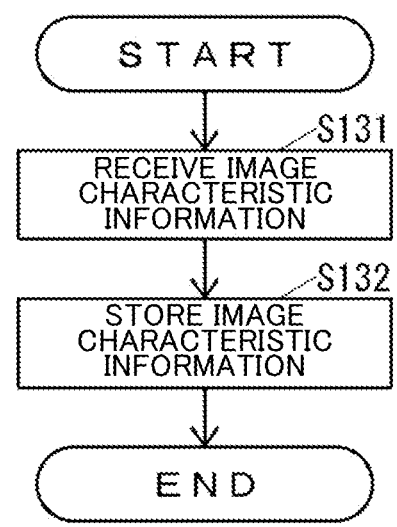
FIG. 7 is a flowchart for explaining the operation of the MFP shown in FIG. 2 for setting the image characteristic information.

Upon receiving an instruction to set the image characteristic information, the control portion 28 of the MFP 20 performs the operation shown in FIG. 7.

FIG. 7 is a flowchart of the operation of the MFP 20 for setting the image characteristic information.

As shown in FIG. 7, the control portion 28 receives the image characteristic information via the operation portion 21 (S131).

Subsequently, the control portion 28 causes, via the network communication portion 26, the management server 30 to store the image characteristic information, which was received in S131, as the image characteristic information 34c that is associated with the user ID of the user who is logging in (S132), and ends the operation shown in FIG. 7.

Next, the operation of the MFP 20 for setting the preview log image necessary/unnecessary information is described.

The user of the MFP 20 can, via the operation portion 21, instruct the MFP 20 to set the preview log image necessary/unnecessary information for a target image. Here, the target image is an image to be a target of a job that is instructed to be executed by the user via the operation portion 21 of the MFP 20. For example, the target image is: an image to be a target of a "copy" job in which an image read from a document sheet by the scanner 23 is printed on a recording medium by the printer 24; an image to be a target of a "FAX transmission" job in which an image is transmitted by facsimile by the FAX communication portion 25; or an image to be a target of a "transmission" job in which an image is transmitted by the network communication portion 26.

Figure 8:
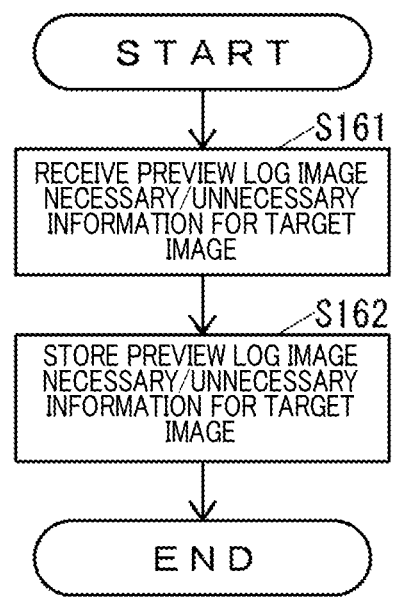
FIG. 8 is a flowchart for explaining the operation of the MFP shown in FIG. 2 for setting the preview log image necessary/unnecessary information for the target image.

Upon receiving an instruction to set the preview log image necessary/unnecessary information for the target image, the control portion 28 of the MFP 20 performs the operation shown in FIG. 8.

FIG. 8 is a flowchart of the operation of the MFP 20 for setting the preview log image necessary/unnecessary information for the target image.

As shown in FIG. 8, the preview log image necessary/unnecessary receiving portion 28b of the control portion 28 receives the preview log image necessary/unnecessary information for the target image via the operation portion 21 (S161).

Subsequently, the preview log image necessary/unnecessary receiving portion 28b causes, via the network communication portion 26, the management server 30 to store the preview log image necessary/unnecessary information, which was received in S161, as the preview log image necessary/unnecessary information 34e that is associated with: the user ID of the user who is logging in; and the identification information of the target image (S162), and ends the operation shown in FIG. 8.

Next, the operation of the MFP 20 for executing the preview is described.

The user of the MFP 20 can, via the operation portion 21, instruct the MFP 20 to execute the preview of the target image.

Figure 9:
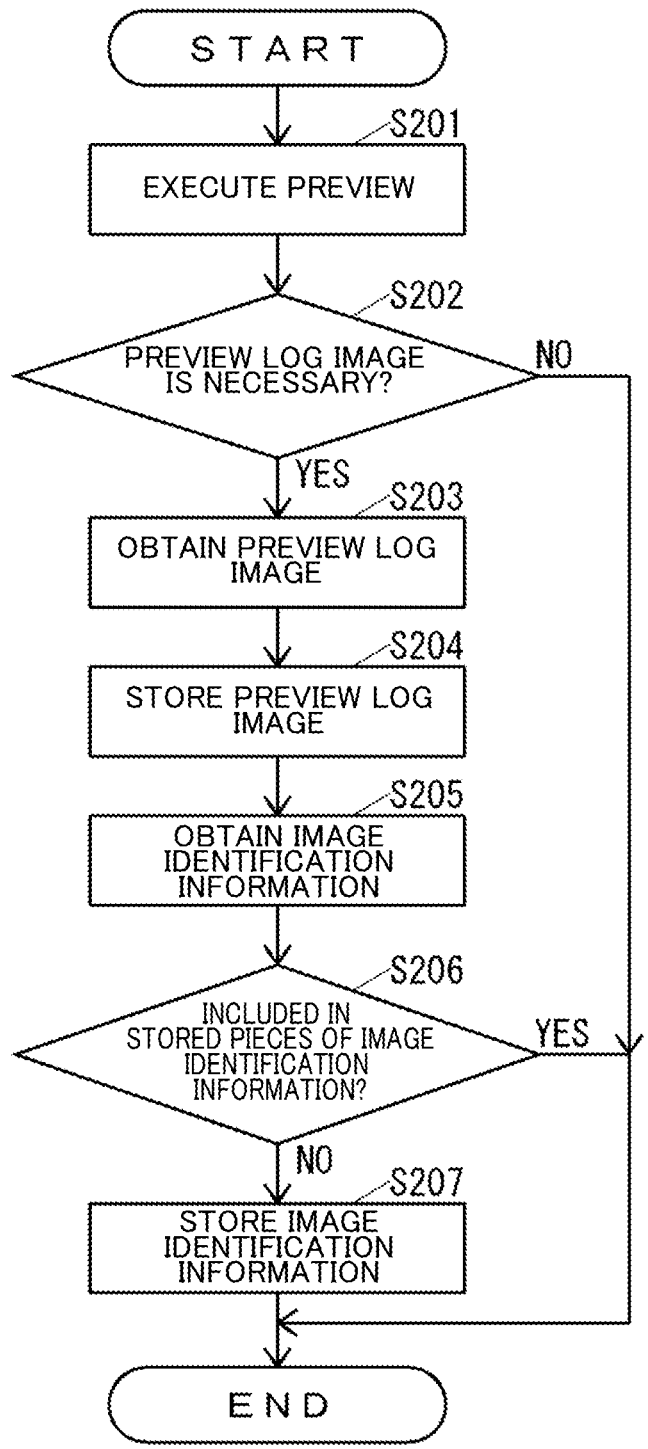
FIG. 9 is a flowchart for explaining the operation of the MFP shown in FIG. 2 for executing the preview of the target image.

Upon receiving an instruction to execute the preview of the target image, the control portion 28 of the MFP 20 performs the operation shown in FIG. 9.

FIG. 9 is a flowchart of the operation of the MFP 20 for executing the preview of the target image.

As shown in FIG. 9, the preview executing portion 28c of the control portion 28 executes the preview of the target image (S201).

Subsequently, the log image obtaining portion 28d receives, from the management server 30 via the network communication portion 26, the preview log image necessary/unnecessary information 34e that is associated with: the user ID of the user who is logging in; and the identification information of the target image. The log image obtaining portion 28d then determines whether or not a preview log image is necessary, based on the received preview log image necessary/unnecessary information 34e (S202). Here, when the preview log image necessary/unnecessary information 34e that is associated with the user ID of the user who is logging in and the identification information of the target image does not exist, the log image obtaining portion 28d determines, in S202, that a preview log image is not necessary. It is noted that, when the preview log image necessary/unnecessary information 34e that is associated with the user ID of the user who is logging in and the identification information of the target image does not exist, the log image obtaining portion 28d may determine, in S202, that a preview log image is necessary.

Upon determining, in S202, that a preview log image is not necessary, the log image obtaining portion 28d ends the operation shown in FIG. 9.

Upon determining, in S202, that a preview log image is necessary, the log image obtaining portion 28d obtains a preview log image of the target image of the preview executed in S201 (S203), and causes, via the network communication portion 26, the management server 30 to store the preview log image as a log image 34f that is associated with the user ID of the user who is logging in (S204). It is noted that the control portion 28 obtains preview history information, and causes the management server 30 to store the preview history information in association with the log image 34f that the management server 30 was caused to store in S204. It is noted that the preview history information includes: the date and time at which the preview was executed in S201; and the user ID of the user who was logging in to the MFP 20 at the time when the preview was executed in S201.

After the process of S204, the image identification information obtaining portion 28e receives, from the management server 30 via the network communication portion 26, the image characteristic information 34c that is associated with the user ID of the user who is logging in. The image identification information obtaining portion 28e then obtains image identification information of the target image of the preview executed in S201, based on the received image characteristic information 34c (S205).

Subsequently, the image identification information obtaining portion 28e receives, from the management server 30 via the network communication portion 26, all pieces of image identification information 34d associated with the user ID of the user who is logging in. The image identification information obtaining portion 28e then determines whether or not the image identification information obtained in S205 is included in the received pieces of image identification information 34d (S206).

Upon determining, in S206, that the image identification information obtained in S205 is included in the received pieces of image identification information 34d, the image identification information obtaining portion 28e ends the operation shown in FIG. 9.

Upon determining, in S206, that the image identification information obtained in S205 is not included in the received pieces of image identification information 34d, the image identification information obtaining portion 28e causes, via the network communication portion 26, the management server 30 to store the image identification information obtained in S205 as a new piece of image identification information 34d associated with the user ID of the user who is logging in (S207), and ends the operation shown in FIG. 9.

Next, the operation of the MFP 20 for executing a job is described.

The user of the MFP 20 can, via the operation portion 21, instruct the MFP 20 to execute a job based on the target image.

Upon receiving an instruction to execute a job based on the target image, the control portion 28 of the MFP 20 performs the operation shown in FIG. 10.

FIG. 10 is a flowchart of the operation of the MFP 20 for executing a job based on the target image.

As shown in FIG. 10, the job executing portion 28f of the control portion 28 executes the job based on the target image (S231).

Subsequently, the image identification information obtaining portion 28e receives, from the management server 30 via the network communication portion 26, the image characteristic information 34c that is associated with the user ID of the user who is logging in. The image identification information obtaining portion 28e then obtains image identification information of the target image of the job executed in S231, based on the received image characteristic information 34c (S232).

Subsequently, the log image obtaining portion 28d receives, from the management server 30 via the network communication portion 26, the log image coexistence necessary/unnecessary information 34b that is associated with the user ID of the user who is logging in. The log image obtaining portion 28d then determines whether or not coexistence of log images is necessary, based on the received log image coexistence necessary/unnecessary information 34b (S233). Here, when the log image coexistence necessary/unnecessary information 34b that is associated with the user ID of the user who is logging in does not exist, the log image obtaining portion 28d determines, in S233, that coexistence of log images is necessary. It is noted that, when the log image coexistence necessary/unnecessary information 34b that is associated with the user ID of the user who is logging in does not exist, the log image obtaining portion 28d may determine, in S233, that coexistence of log images is not necessary.

Upon determining, in S233, that coexistence of log images is not necessary, the log image obtaining portion 28d determines whether or not the target image of the job executed in S231 is the same as a target image of a past preview (S234). Here, the log image obtaining portion 28d receives, from the management server 30 via the network communication portion 26, the image identification information obtained in S232 and all pieces of image identification information 34d of target images of previews among the image identification information 34d associated with the user ID of the user who is logging in. The log image obtaining portion 28d determines that the target image of the job executed in S231 is the same as a target image of a past preview when the image identification information obtained in S232 is the same as any of all pieces of image identification information 34d of target images of previews. On the other hand, the log image obtaining portion 28d determines that the target image of the job executed in S231 is not the same as any of target images of past previews when the image identification information obtained in S232 is not the same as any of all pieces of image identification information 34d of target images of previews.

The log image obtaining portion 28d obtains a log image of the target image of the job executed in S231 (S235) when it determines in S233 that coexistence of log images is necessary or determines in S234 that the target image of the job is not the same as any of target images of past previews. The log image obtaining portion 28d then causes, via the network communication portion 26, the management server 30 to store this log image as a log image 34f associated with the user ID of the user who is logging in (S236), and ends the operation shown in FIG. 10. It is noted that, in parallel with the process in S235, the control portion 28 obtains job history information that includes: the date and time at which the job was executed in S231; the user ID of the user who was logging in to the MFP 20 at the time when the job was executed in S231; and the identification information of the MFP 20 that executed the job in S231. The control portion 28 then causes the management server 30 to store this job history information in association with the log image 34f that the management server 30 was caused to store in S236.

Upon determining, in S234, that the target image of the job is the same as a target image of a past preview, the log image obtaining portion 28d does not cause the management server 30 to store the log image 34f, and ends the operation shown in FIG. 10. It is noted that even when the management server 30 is not caused to store the log image 34f, the control portion 28 obtains the above-mentioned job history information and causes the management server 30 to store the job history information.

As described above, the image forming system 10 obtains a log image 34f (S203) of the preview (S201), and stores the log image 34f in the storage portion 34 (S204). With this structure, when an information leakage occurs, the administrator can check the log image 34f of the preview and determine whether or not there is a possibility that the information leakage occurred from the preview. Upon determining that there is a possibility that the information leakage occurred from the preview, the administrator can narrow down possible persons who made the information leakage if it is possible in some way to identify the persons who might have seen the preview. Knowing that the administrator can narrow down possible persons who made information leakage, a person who intends to make an information leakage may inhibit himself/herself from actually making the information leakage. As a result, the image forming system 10 can suppress information leakage from occurring from a preview.

As described above, since the image forming system 10 allows the user to specify (S161) whether or not the log image 34f of the preview (S201) is necessary, if, with regard to the target image of the preview, the user does not desire to suppress information leakage from the preview, the image forming system 10 can inhibit (S202 NO) the log image 34f of the preview from being stored in the storage portion 34 (S204). As a result, the image forming system 10 can restrict the storage capacity required for the log images 34f.

As described above, when the image forming system 10 stores the log image 34f of the preview (S201) into the storage portion 34 (S204) and determines that the target image of the job is the same as a target image of a past preview (S234 YES), the image forming system 10 does not store the log image 34f of the job (S231) into the storage portion 34 (S236). As a result, the image forming system 10 can restrict the storage capacity required for the log image 34f.

As described above, since the image forming system 10 can allow the user to specify whether or not coexistence of the log image 34f of the preview (S201) and the log image 34f of the job (S231) is necessary (S101), when the target image of the preview and the target image of the job are same, and the user desires coexistence of the log image 34f of the preview and the log image 34f of the job (S233 YES), the image forming system 10 can store the two log images 34f as coexisting in the storage portion 34 (S236).

It is noted that when it is possible to restrict the storage capacity required for the log images 34f, the image forming system 10 can suppress the information leakage even if the storage capacity of the storage portion 34 is small.

The image forming system 10 can determine whether or not the target image of the preview and the target image of the job are same, by using a simple structure of the image identification information 34d (S234), it is possible to suppress a burden on the determination process of S234.

In the image forming system 10, the MFP 20 executes the processes shown in FIGS. 6-10. However, not limited to this, the management server 30 may execute at least a part of the processes shown in FIGS. 6-10, except for the processes of S201 and S231.

In the image forming system 10, the authentication information, log image coexistence necessary/unnecessary information, image characteristic information, image identification information, preview log image necessary/unnecessary information, and log images are stored in the storage portion 34 of the management server 30. However, not limited to this, at least a part of these pieces of information may be stored in the storage portion 27 of the MFP 20.

The image forming system 10 may not include the management server 30 when all of the authentication information, log image coexistence necessary/unnecessary information, image characteristic information, image identification information, preview log image necessary/unnecessary information, and log images are stored in the storage portion 27 of the MFP 20.

As described above, the image forming system 10 can restrict the storage capacity required for storing log images when the log images are stored in the storage portion 27 of the MFP 20. Accordingly, the present disclosure is applicable to an MFP 20 including a storage portion 27 that is small in storage capacity due to lack of an HDD or the like.

In the image forming system 10, the image characteristic information includes both of forms and keywords. However, not limited to this, the image characteristic information may include either forms or keywords. In that case, the image forming system 10 may allow the user to set which of forms or keywords are to be included in the image characteristic information.

In the embodiment, the image forming system 10 includes an MFP as the image forming apparatus of the present disclosure. However, not limited to this, the image forming system may include another image forming apparatus such as a specialized printing device, a specialized copying device or a specialized facsimile device, instead of the MFP.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image forming system comprising:
a job executing portion, executed by a processor, that executes a job based on an image;
a preview executing portion, executed by the processor, that executes displaying a preview of the image before the job is executed;

a log image obtaining portion, executed by the processor, that obtains a log image as a history of the image and stores the log image in a storage portion; and an image identification information obtaining portion, executed by the processor, that obtains image identification information that indicates how much of a specific characteristic the image has, wherein the storage portion stores one or more pieces of image characteristic identification information that were obtained by the image identification information obtaining portion respectively in correspondence with one or more images that were target images of the preview executed in the past, the log image obtaining portion determines whether or not any of the one or more pieces of image characteristic identification information stored in the storage portion and the image identification information obtained by the image identification information obtaining portion with respect to a target image of the preview image are the same, and (i) upon determining that any of the one or more pieces of image characteristic identification information and the image identification information of the target image of the preview are the same, determines that the target image of the preview in the past corresponding to the any of the one or more pieces of image characteristic identification information and the target image of the job are the same and does not store the log image of the job into the storage portion, and (ii) upon determining that none of the one or more pieces of image characteristic identification information are the same as the image identification information, determines that none of the target images of the preview in the past are the same as the target image of the job and stores the job image of the job into the storage portion.

2. The image forming system according to claim 1, further comprising a preview log image necessary/unnecessary receiving portion, executed by the processor, that receives an instruction on whether the log image of the preview is necessary or unnecessary, wherein when the preview log image necessary/unnecessary receiving portion receives the instruction that the log image of the preview is unnecessary, the log image obtaining portion does not store the log image in the storage portion.

3. The image forming system according to claim 1, further comprising a log image coexistence necessary/unnecessary receiving portion, executed by the processor, that receives an instruction on whether or not coexistence of log images is necessary, wherein when the log image coexistence necessary/unnecessary receiving portion receives the instruction that coexistence of log images is necessary, the log image obtaining portion stores the log image of the job in the storage portion regardless of whether the target image of the preview and the target image of the job are the same.

4. The image forming system according to claim 1, wherein when the target image of the job includes a form as the specific characteristic, the image identification information indicates determination results of determining whether the form is a match or a mismatch against a predetermined form.

5. The image forming system according to claim 1, wherein when the target image of the job includes a keyword as the specific characteristic, the image identification information indicates number of appearances of the keyword.

6. An image forming apparatus comprising:

a job executing portion, executed by the processor, that executes a job based on an image;

a preview executing portion, executed by the processor, that executes displaying a preview of the image before the job is executed;

a log image obtaining portion, executed by the processor, that obtains a log image as a history of the image and stores the log image in a storage portion; and an image identification information obtaining portion, executed by the processor, that obtains image identification information that indicates how much of a specific characteristic the image has, wherein the storage portion stores one or more pieces of image characteristic identification information that were obtained by the image identification information obtaining portion respectively in correspondence with one or more images that were target images of the preview executed in the past, the log image obtaining portion determines whether or not any of the one or more pieces of image characteristic identification information stored in the storage portion and the image identification information obtained by the image identification information obtaining portion with respect to a target image of the preview image are the same, and (i) upon determining that any of the one or more pieces of image characteristic identification information and the image identification information of the target image of the preview are the same, determines that the target image of the preview in the past corresponding to the any of the one or more pieces of the image characteristic identification information and the target image of the job are the same and does not store the log image of the job into the storage portion, and (ii) upon determining that none of the one or more pieces of the image characteristic identification information are the same as the image identification information, determines that none of the target images of the preview in the past are the same as the target image of the job and stores the job image of the job into the storage portion.

7. A computer-readable non-transitory storage medium storing an image forming program that causes a computer to execute:

a first step of executing a job based on an image;

a second step of executing displaying a preview of the image before the job is executed;

a third step of obtaining a log image as a history of the image and storing the log image in a storage portion;

a fourth step of obtaining a log image of the preview;

a fifth step of obtaining image identification information that indicates how much of a specific characteristic the image has;

a sixth step of storing one or more pieces of image characteristic identification information that were obtained by the image identification information obtaining portion respectively in correspondence with one or more images that were target images of the preview executed in the past;

a seventh step of determining whether or not any of the one or more pieces of image characteristic identification information stored in the storage portion and the image identification information obtained in the fifth step with respect to a target image of the preview are the same;

an eighth step of, upon determining that any of the one or more pieces of image characteristic identification information and the image identification information of the target image of the preview are the same, determining that the target image of preview executed in the past corresponding to the any of the one or more pieces of image characteristic identification information and a target image of the job are the same and not storing the log image of the job into the storage portion; and a ninth step of, upon determining that none of the one or more pieces of the image characteristic identification information are the same as the image identification information, determining that none of the target images of the preview in the past are the same as the target image of the job and storing the log image of the job into the storage portion.

\* \* \* \* \*